(12) United States Patent
Dugas et al.

(10) Patent No.: US 11,955,015 B2
(45) Date of Patent: Apr. 9, 2024

(54) FLIGHT DATA AGGREGATION SYSTEM INCLUDING PORTABLE ELECTRONIC DEVICES

(71) Applicant: The Boeing Company, Chicago, IL (US)

(72) Inventors: André Dugas, Greenwood Village, CO (US); Joerg Robert Oliver Schmidt, Phoenix, AZ (US); Millie Irene Sterling, Wiesbaden (DE)

(73) Assignee: The Boeing Company, Chicago, IL (US)

( * ) Notice: Subject to any disclaimer, the term of this patent is extended or adjusted under 35 U.S.C. 154(b) by 236 days.

(21) Appl. No.: 17/375,230

(22) Filed: Jul. 14, 2021

(65) Prior Publication Data

US 2023/0020614 A1    Jan. 19, 2023

(51) Int. Cl.
*G08G 5/00* (2006.01)
*B64D 11/00* (2006.01)
*G01S 17/933* (2020.01)

(52) U.S. Cl.
CPC ......... *G08G 5/003* (2013.01); *B64D 11/0015* (2013.01); *G01S 17/933* (2013.01); *G08G 5/0008* (2013.01)

(58) Field of Classification Search
CPC .................................... G08G 5/0008
See application file for complete search history.

(56) References Cited

U.S. PATENT DOCUMENTS

| 9,881,507 B2 | 1/2018 | Rencher et al. |
| 10,796,508 B2 | 10/2020 | Lonski et al. |
| 2014/0106333 A1* | 4/2014 | Dugan ................. G07C 5/0825 340/978 |
| 2015/0339241 A1 | 11/2015 | Warner et al. |

FOREIGN PATENT DOCUMENTS

| EP | 3667253 A1 | 6/2020 |
| WO | 2018011791 A2 | 1/2018 |

OTHER PUBLICATIONS

European Patent Office. Extended European Search Report for European Application No. 22164876.9, dated Sep. 5, 2022, pp. 1-9.

\* cited by examiner

*Primary Examiner* — Jason Holloway
*Assistant Examiner* — Christopher A Buksa
(74) *Attorney, Agent, or Firm* — Vivacqua Crane PLLC

(57) ABSTRACT

A flight data aggregation system for a plurality of aircraft includes one or more portable electronic devices in electronic communication with one or more central computers. The one or more portable electronic devices each monitor flight data from a corresponding aircraft. The one or more portable electronic devices analyze the flight data in real-time to determine an insight event indicating an incident of significance is presently occurring upon the corresponding aircraft. Each central computer includes one or more processors and a memory coupled to the one or more processors. The central computers are caused to receive the flight data collected during the insight event from an individual portable electronic device. The central computers determine overall flight data patterns based on the flight data collected during the insight event received from the individual portable electronic device and historical data stored in the one or more databases.

20 Claims, 6 Drawing Sheets

//FLIGHT DATA AGGREGATION SYSTEM INCLUDING PORTABLE ELECTRONIC DEVICES

INTRODUCTION

The present disclosure relates to a flight data aggregation system and method. More particularly, the present disclosure is directed towards a flight data aggregation system for a plurality of aircraft, where the flight data is monitored and analyzed by one or more portable electronic devices.

BACKGROUND

Gathering and aggregating large amounts of flight data is often a complicated, expensive, and time-consuming process. Some examples of technologies that focus on aggregating flight data include, but are not limited to, automatic dependent surveillance-broadcast (ADS-B) feeds, reporting databases such as the Aviation Safety Reporting System (ASRS), and regulatory initiatives such as the European aeronautical information services database (EAD) and the International Civil Aviation Organization (ICAO) databases.

Existing technologies for aggregating flight data may lack the ability to gather and process the flight data in real-time. For example, legacy systems such as the Aircraft Communications Addressing and Reporting System (ACARS) may be employed to gather and share flight data. However, ACARS may be slow and relatively expensive. Newer approaches may utilize faster, more ubiquitous data feeds such as ADS-B. However, this approach provides only limited data parameters and insight for analysis. Therefore, there is a desire for an improved system and method for efficiently gathering and aggregating flight data.

SUMMARY

According to several aspects, a flight data aggregation system for a plurality of aircraft is disclosed. The flight data aggregation system includes one or more portable electronic devices that each monitor flight data from a corresponding aircraft. The one or more portable electronic devices analyze the flight data in real-time to determine that an insight event indicating an incident of significance is presently occurring upon the corresponding aircraft. The flight data aggregation system also includes one or more central computers in electronic communication with at least one of the one or more portable electronic devices. Each central computer includes one or more processors and a memory coupled to the one or more processors. The memory stores data into one or more databases and program code that, when executed by the one or more processors, causes the one or more central computers to receive flight data collected during an insight event from an individual portable electronic device. The one or more central computers also determine one or more overall flight data patterns based on the flight data collected during the insight event received from the individual portable electronic device and historical data stored in the one or more databases. The historical data represents previously collected flight data associated with insight events that occurred upon the plurality of aircraft.

In another aspect, a flight data aggregation system for a plurality of aircraft is disclosed. The flight data aggregation system includes one or more portable electronic devices that each monitor flight data from one of the plurality of aircraft. The one or more portable electronic devices include a plurality of sensors that monitor the flight data associated with one of the plurality of aircraft. An individual portable electronic device is configured to analyze the flight data in real-time to determine that an insight event indicating an incident of significance is presently occurring upon a corresponding aircraft. In response to determining that the insight event is presently occurring, the individual portable electronic device transmits the flight data associated with the insight event. The flight data aggregation system also includes one or more central computers in electronic communication with the individual portable electronic device. Each central computer includes one or more processors and a memory coupled to the one or more processors. The memory stores data into one or more databases and program code that, when executed by the one or more processors, causes each of the one or more central computers to receive flight data associated with the insight event from an individual portable electronic device. The one or more central computers also determine one or more overall flight data patterns based on the flight data associated with the insight event received from the portable electronic device and historical data stored in the one or more databases. The historical data represents previously collected flight data associated with insight events that occurred upon the plurality of aircraft.

In yet another aspect, a method for aggregating flight data for a plurality of aircraft by one or more portable electronic devices is disclosed. The method includes monitoring, by an individual portable electronic device, flight data from a corresponding aircraft, where the one or more portable electronic devices each include a plurality of sensors that monitor the flight data from the corresponding aircraft. The method also includes determining, by the individual portable electronic device, an insight event indicating an incident of significance is presently occurring upon the corresponding aircraft. The insight event indicates an incident of significance is presently occurring upon the corresponding aircraft. The method includes transmitting, by the individual portable electronic device, the flight data collected during the insight event to one or more central computers. The method also includes receiving, by the one or more central computers, the flight data collected during the insight event from the individual portable electronic device. Finally, the method includes determining, by the one or more central computers, one or more overall flight data patterns based on the flight data collected during the insight event based on the insight event received from the portable electronic device and historical data stored in one or more databases. The historical data represents previously collected flight data associated with insight events that occurred upon the plurality of aircraft.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a flight data aggregation system for a plurality of aircraft, where the flight data is monitored and analyzed by one or more portable electronic devices that operate independently from the aircraft. The one or more portable electronic devices each include a plurality of sensors that monitor the flight data from a corresponding aircraft in real-time. Each individual portable electronic device analyzes the flight data to determine whether an insight event is presently occurring. The insight event indicates an incident of significance is presently occurring upon the corresponding aircraft. In response to determining that an insight event is presently occurring, the individual portable electronic device transmits the flight data collected during the insight event to one or more central computers. The one or more central computers determine overall flight data patterns based on the flight data collected during the insight event in combination with historical data. The historical data represents previously collected flight data associated with insight events that occurred upon the plurality of aircraft that is saved in one or more databases of the central computers. Thus, the flight data aggregation system leverages the computing power of the portable electronic devices to analyze the flight data, thereby alleviating the need to process the flight data by the one or more central computers.

The following description is merely illustrative in nature and is not intended to limit the present disclosure, application, or uses.

Figure 1:
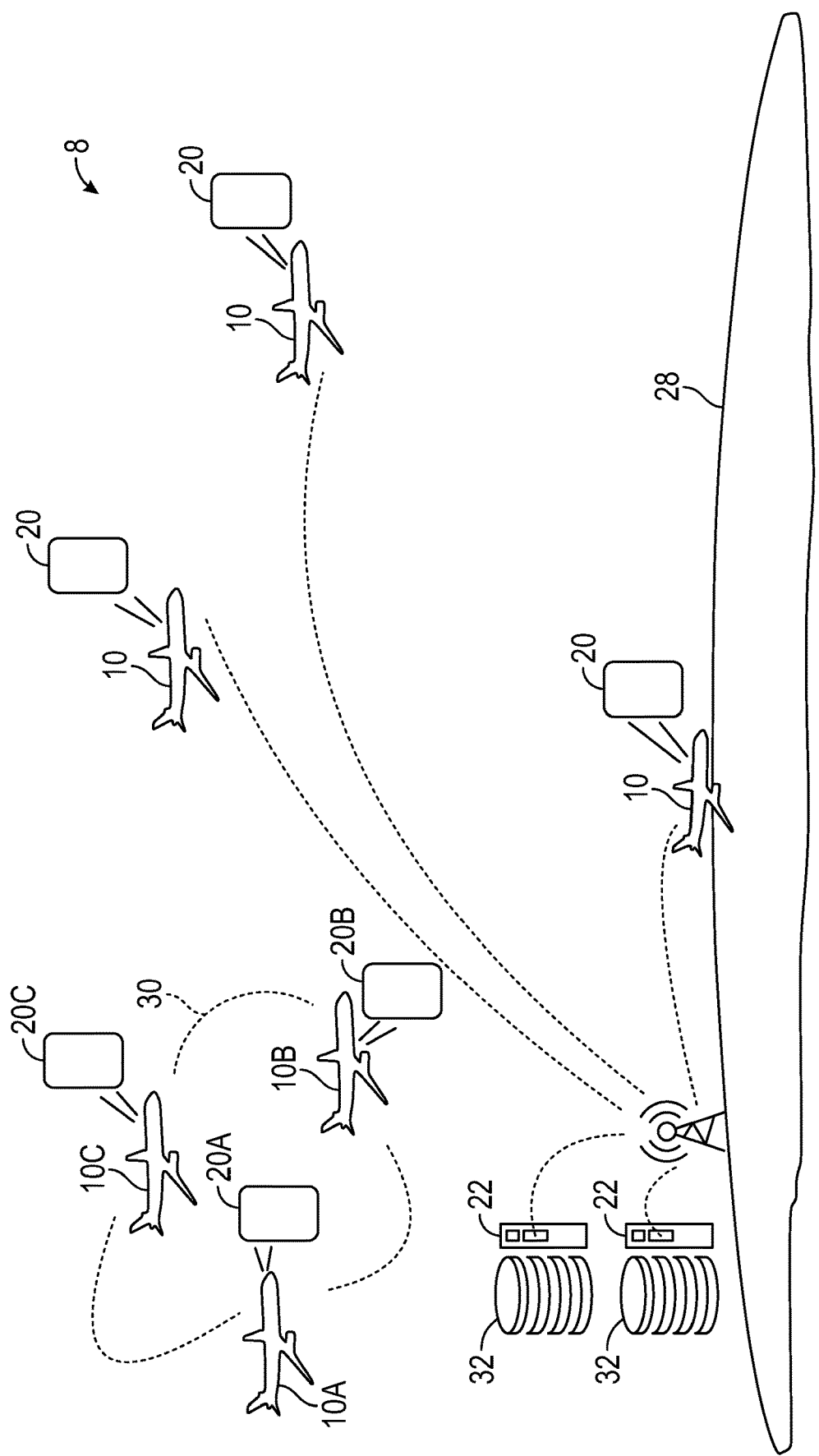
FIG. 1 is schematic diagram illustrating the disclosed flight data aggregation system including a plurality of aircraft and one or more portable electronic devices, according to an illustrative embodiment.

Referring to FIG. 1, a flight data aggregation system 8 for a plurality of aircraft 10 is illustrated. The flight data aggregation system 8 includes one or more portable electronic devices 20 and one or more central computers 22. In the embodiment as shown in FIG. 1, the flight data aggregation system 8 includes a plurality of portable electronic devices 20, where each portable electronic device 20 monitors flight data from a corresponding aircraft 10. Although FIG. 1 illustrates a single portable electronic device 20 associated with each aircraft 10, it is to be appreciated that FIG. 1 is merely illustrative in nature and more than one portable electronic device 20 may be associated with each aircraft 10 as well. The plurality of aircraft 10 are in flight or are located on the ground 28. The one or more central computers 22 are in electronic communication with the one or more central computers 22 using any type of wireless communication protocol. For example, if the aircraft 10 is in flight, the wireless communication protocol may be the Aircraft Communications Addressing and Reporting System (ACARS), and if the aircraft 10 is located on ground 28 the wireless communication protocol may be a fifth generation (5G) broadband cellular network system.

As explained below, the portable electronic devices 20 monitor and analyze flight data from a corresponding aircraft 10 in real-time. Accordingly, the flight data aggregation system 8 leverages the computing power of the portable electronic devices 20 to analyze the flight data, which in turn alleviates the need to process the flight data by the one or more central computers 22 in real-time. Specifically, each portable electronic device 20 analyzes the flight data to determine or identify an insight event. The insight event indicates an incident of significance is presently occurring upon the corresponding aircraft 10. One example of an insight event is the corresponding aircraft 10 undergoing turbulence. In this example, the portable electronic device 20 monitors data collected by a gyroscope and an accelerometer to determine the corresponding aircraft 10 is presently undergoing turbulence. In response to determining the insight event, the portable electronic device 20 transmits the flight data collected during the insight event to the one or more central computers 22. The one or more central computers 22 store historical data in one or more databases 32, where the historical data represents previously collected flight data associated with insight events that occurred upon the plurality of aircraft 10. The one or more central computers 22 determine overall flight data patterns based on the flight data associated with the insight event received from the portable electronic device 20 and the historical data stored in the one or more databases. For example, if the insight event is the corresponding aircraft 10 undergoing turbulence, then the overall flight data pattern is a turbulence map.

In some embodiments, two or more portable electronic devices 20 that monitor flight data from separate aircraft 10 are in electronic communication with one another by a local area network 30. In the example as shown in FIG. 1, three portable electronic devices 20A, 20B, and 20C that are each associated with aircraft 10A, 10B, and 10C are in electronic communication with one another. As explained below, in an embodiment, one of the portable electronic devices 20A, 20B, and 20C that are part of the local area network 30 transmit the flight data associated with the insight event to one or more of the remaining portable electronic devices 20A, 20B, and 20C that are part of the local area network 30. For example, if the portable electronic device 20A determines an insight event, the remaining portable electronic devices 20B, 20C receive the flight data associated with the insight event. Accordingly, the remaining aircraft 10B, 10C may also receive real-time updates based on flight data associated with the aircraft 10A.

In the embodiment as shown in FIG. 1, two central computers 22 are located on the ground 28. However, it is to be appreciated that this illustration is illustrative in nature and the flight data aggregation system 8 may include any number of central computers 22. Furthermore, although FIG. 1 illustrates the one or more central computers 22 on the ground 28, in another embodiment the one or more central computers 22 may be located upon one of the aircraft 10.

The one or more portable electronic devices 20 include any type of electronic device configured to monitor, analyze, and transmit flight data from a corresponding aircraft 10 to the one or more central computers 22. Some examples of portable electronic devices 20 include, but are not limited to, laptop computers, tablet computers, and smartphones. It is to be appreciated that the one or more portable electronic devices 20 are not associated with operation of the corresponding aircraft 10, where operation of the aircraft involves manipulating the flight control systems. In other words, the one or more portable electronic devices 20 are independent with respect to operating the corresponding aircraft 10.

The portable electronic devices 20 may be located onboard the corresponding aircraft 10 or, in the alternative, outside of the corresponding aircraft 10. For example, in one embodiment, the individual portable electronic device 20 may be utilized by the cabin crew of the corresponding aircraft 10 or mounted to a wall of the corresponding aircraft 10. In yet another embodiment, the portable electronic device 20 is the electronic flight bag associated with the corresponding aircraft 10. In another embodiment, the individual portable electronic device 20 is utilized by a passenger onboard the corresponding aircraft 10, where the passenger has granted access to his or her portable electronic device 20. In the alternative, the portable electronic device 20 is used by an individual located outside of the corresponding aircraft 10.

Figure 2:
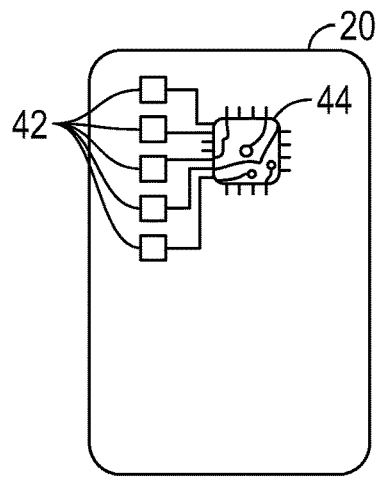
FIG. 2 is a schematic diagram illustrating one of the portable electronic devices shown in FIG. 1, according to an illustrative embodiment.

FIG. 2 is a schematic diagram illustrating one of the portable electronic devices 20. Each portable electronic device 20 includes a plurality of sensors 42 configured to monitor the flight data associated with the corresponding aircraft 10. The plurality of sensors 42 are in electronic communication with one or more processors 44 of the portable electronic device 20. In one non-limiting embodiment, the plurality of sensors 42 include one or more of the following: a magnetometer, a gyroscope, an accelerometer, a barometer, a microphone, a global positioning system (GPS), a biometric sensor, an air quality sensor, a humidity sensor, an ambient temperature sensor, an infrared sensor, and a light detection and ranging (LiDAR) sensor, however, it is to be appreciated that the portable electronic devices 20 may include other types of sensors may be used as well.

The one or more processors 44 of each portable electronic device 20 monitor the flight data collected by the plurality of sensors 42 and analyze the flight data to determine that the insight event indicating the incident of significance presently occurring upon the corresponding aircraft 10. The insight event includes any type of incident occurring upon the corresponding aircraft 10 that creates a change in one or more parameters, where the one or more parameters are measured by the plurality of sensors 42 of each portable electronic device 20. As mentioned above, one example of the insight event is when the corresponding aircraft 10 undergoes turbulence. In the present example, the change in one or more parameters created by turbulence include acceleration forces, which are measured by accelerometers, and a rate of rotation about an axis, which is measured by gyroscopes. In addition to turbulence, some examples of the insight event include, but are not limited to, landing distance, out, off, on and in (OOOI) times, takeoff distance, phase of flight, a congested taxiway, flight level change, holding, height loss during the climb phase of flight, lavatory use, de-icing or anti-icing status, runway surface conditions, GPS spoofing or jamming events, and crew punctuality and location tracking.

Figure 3A:
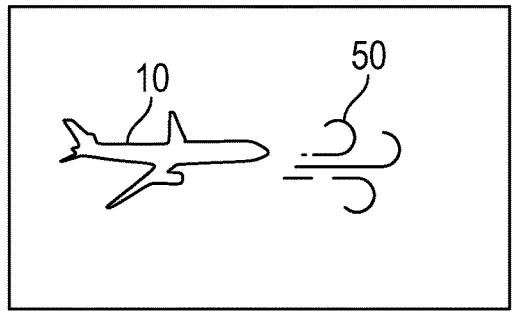
FIGS. 3A-3G illustrate the portable electronic device determining an insight event that is presently occurring onboard a corresponding aircraft, according to an illustrative embodiment.
Figure 3B:
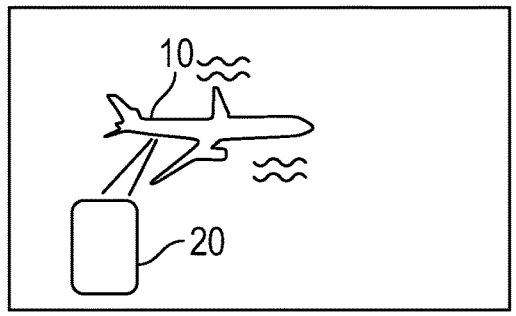
Figure 3C:
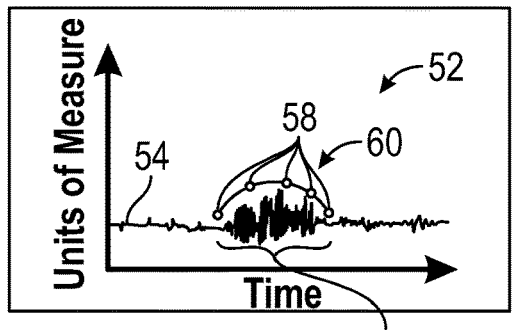
Figure 3D:
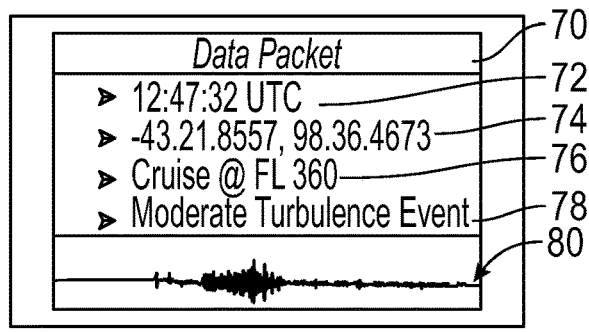
Figure 3E:
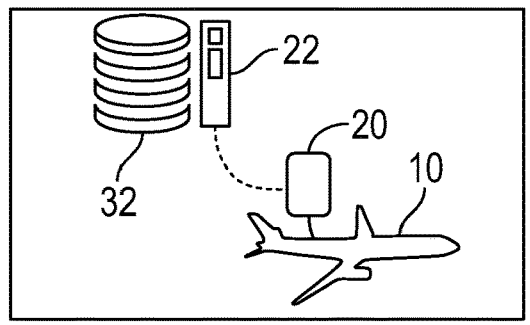
Figure 3F:
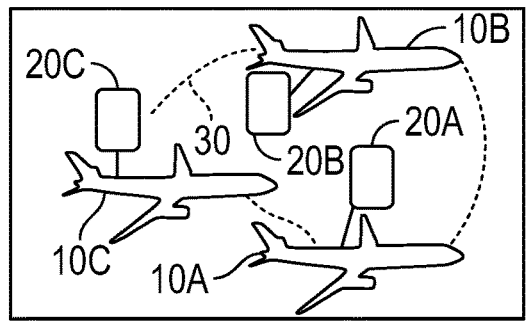
Figure 3G:
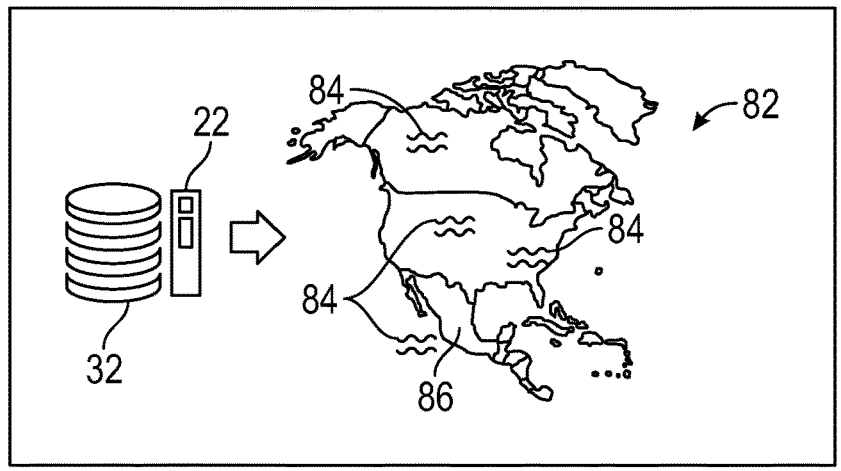

FIGS. 3A-3G illustrate the one or more processors 44 of the portable electronic device 20 determining the insight event and transmitting the flight data associated with the insight event to either the one or more central computers 22 (seen in FIG. 3E) or to one or more portable electronic devices 20 that are part of the local area network 30 (seen in FIG. 3F). In the embodiment as described and as shown in FIGS. 3A-3G, the insight event is the corresponding aircraft 10 undergoing turbulence, however, it is to be appreciated that FIGS. 3A-3G are merely illustrative in nature and the insight event is not limited to turbulence.

Referring now to FIG. 3A, the corresponding aircraft 10 undergoes turbulence. In the example as shown in FIG. 3A, turbulence is created by a jet stream 50. Referring now to FIG. 3B, the corresponding aircraft 10 experiences irregular motion while undergoing turbulence. As the corresponding aircraft 10 undergoes turbulence, the one or more processors 44 of the portable electronic device 20 monitor the plurality of sensors 42 (seen in FIG. 2) for one or more parameters. The one or more parameters are measured by the one or more of plurality of sensors 42. In the present example, the one or more parameters include acceleration forces and a rate of rotation about an axis.

FIG. 3C shows a graph 52 illustrating a plot 54 representing the one or more parameters measured over time, where an x-axis of the graph 52 represents time and a y-axis represents units of measure. In the embodiment as shown in FIG. 3C, the plot 54 measures a turbulence event 56. Referring to both FIGS. 2 and 3A, the one or more processors 44 of the portable electronic device 20 compare the plot 54 representing one or more parameters over time with a predetermined trend 60 representing a change in value of the one or more parameters, where the predetermined trend 60 signifies the insight event is presently occurring.

The one or more processors 44 of the individual portable electronic device 20 determine the one or more parameters follow the predetermined trend 60 based on a change in value of the one or more parameters, a duration of time as the one or more parameters change in value, and contextual information regarding operation of the corresponding aircraft 10. In the example as shown in FIG. 3C, the predetermined trend 60 is illustrated as a plurality of trend lines 58, and the plot 54 follows an overall direction of the trend lines 58 during the turbulence event 56. Accordingly, since the plot 54 represents the one or more parameters, the one or more processors 44 of the individual portable electronic device 20 determines the plot 54 follows the overall direction of the trend lines 58 based on the change in value of the plot 54, the duration of time as the plot 54 changes in value, and contextual information regarding operation of the corresponding aircraft 10. Specifically, as seen in FIG. 3C, the plot 54 increases and decreases in value in the same direction as the trend lines 58 of the predetermined trend 60. The plot 54 also includes a similar duration in time as the trend lines 58 of the predetermined trend 60.

The contextual information regarding operation of the corresponding aircraft 10 includes information such as, but not limited to, phase of flight, aircraft position (coordinates and altitude), external data collected from aircraft avionics or other personal electronic devices, weather conditions, wind conditions, traffic conditions, and crew and passenger rosters. In the present example, the contextual information includes the phase of flight because the corresponding aircraft 10 may experience a change in value of the acceleration forces and the rate of rotation about an axis for a duration of time that indicates the corresponding aircraft 10 is undergoing turbulence during the takeoff phase of flight. However, the change in value of the acceleration forces and the rate of rotation about an axis are created because the corresponding aircraft 10 is undergoing takeoff, and not because the corresponding aircraft 10 is undergoing turbulence. Thus, the corresponding aircraft 10 is not experiencing the insight event.

In response to determining the one or more parameters follow the predetermined trend 60, the portable electronic device 20 determines the insight event is presently occurring upon the corresponding aircraft 10. In response to determining the insight event is presently occurring, the one or more processors 44 (seen in FIG. 2) of the portable electronic device 20 transmit the flight data associated with the insight event to the one or more central computers 22, which is shown in FIG. 3E. As explained below, the one or more central computers 22 determine the overall flight data patterns based on the flight data associated with the insight event received from the portable electronic device 20.

In addition to or in the alternative, the one or more processors 44 of the portable electronic device 20 transmit the flight data associated with the insight event to one or more portable electronic devices 20 that are connected to the local area network 30, which is shown in FIG. 3F. The local area network 30 connects two or more portable electronic devices 20 that monitor flight data from separate aircraft 10. For example, in the embodiment as shown in FIG. 3F, the individual portable electronic device 20A connected to the local area network 30 transmits the flight data associated with the insight event to one or more of remaining portable electronic devices 20B, 20C that are connected to the local area network 30.

Referring now to FIG. 3D, the flight data associated with the insight event includes a data packet 70. In the embodiment as shown in FIG. 3D, the data packet 70 includes one or more of the following: a time 72 when the insight event occurred, a location 74 where the insight event occurred, a phase of flight 76 when the insight event occurred, the specific type of insight event 78, and one or more raw data samples 80, however, the data packet 70 may include other or different data as well. In the example as shown, the time 72 is 12:47:32 in Coordinated Universal Time (UTC), the location is expressed in latitude and longitude, the phase of flight is cruise, and the specific type of insight event 78 is a moderate turbulence event.

Referring now to FIGS. 1 and 3F, the one or more central computers 22 determine overall flight data patterns based on the flight data associated with the insight event received from the portable electronic device 20 and the historical data stored in the one or more databases 32. In other words, the one or more central computers 22 determine trends and patterns that occur based on the insight event received from the portable electronic device 20 in addition to the historical data stored in the one or more databases 32 over a period of time to determine the overall flight data patterns. The historical data stored in the one or more databases 32 represents previously collected flight data associated with insight events that occurred upon the plurality of aircraft 10 (FIG. 1). The historical data is collected over a period of time such as, for example, several minutes, days, weeks, months, or years. For example, the historical data may include turbulence events collected over several days or weeks from various aircraft 10 that have traveled throughout a specific geographical region.

In the example as shown in FIG. 3F, the insight event is turbulence and the overall flight data pattern is a turbulence map 82. The turbulence map 82 indicates areas 84 in a geographic region 86 where turbulence has been experienced by one or more of the plurality of aircraft 10 (FIG. 1). Although FIG. 3F illustrates the geographic region 86 as North America, it is to be appreciated that any geographic region may be used to create the turbulence map 82. The turbulence map 82 is determined based on trends or patterns that occur with respect to turbulence that the plurality of aircraft 10 experience over time. In another example, if the insight event is a congested taxiway, then the overall flight data pattern indicates locations and dates and times where taxiways at a specific airport experience heightened congested. For example, the one or more central computers 22 may determine that the taxiways at the Heathrow airport located in London, England experience the most congestion on a Friday afternoon when compared to other times of the day or the week. In yet another example, if the insight event is runway conditions, then the overall flight data pattern indicates various factors that may affect an aircraft during takeoff and landing such as, but not limited to, precipitation on the ground (i.e., water, snow, or ice), cracks and bumps on the runway surface, the length of the runway, and observed approach patterns.

Referring back to FIG. 1, in one embodiment, the flight data associated with the insight event is collected based on a particular airline fleet, a common manufacturer, or by a specific insight event. Specifically, in one embodiment, the plurality of aircraft 10 are part of the same airline fleet, and the one or more central computers 22 determine the overall flight patterns based on the flight data collected from the particular airline fleet. In one example, the overall flight patterns of the aircraft fleet are further determined based on aircraft type, route, time of year, and the like. In another embodiment, the plurality of aircraft 10 are each produced by a common manufacturer. The overall flight patterns of the common manufacturer are further determined based on selected airlines, geographic region, aircraft type, and the like. Specifically, a selected airline may choose to opt in and have the flight data collected and analyzed by the common manufacturer. In still another embodiment, the one or more central computers 22 determine the overall flight patterns based on the flight data collected from multiple airlines based on a specific insight event. For example, the one or more central computers 22 may determine the overall flight patterns based on the flight data associated with the corresponding aircraft 10 undergoing turbulence across multiple airlines.

Figure 4:
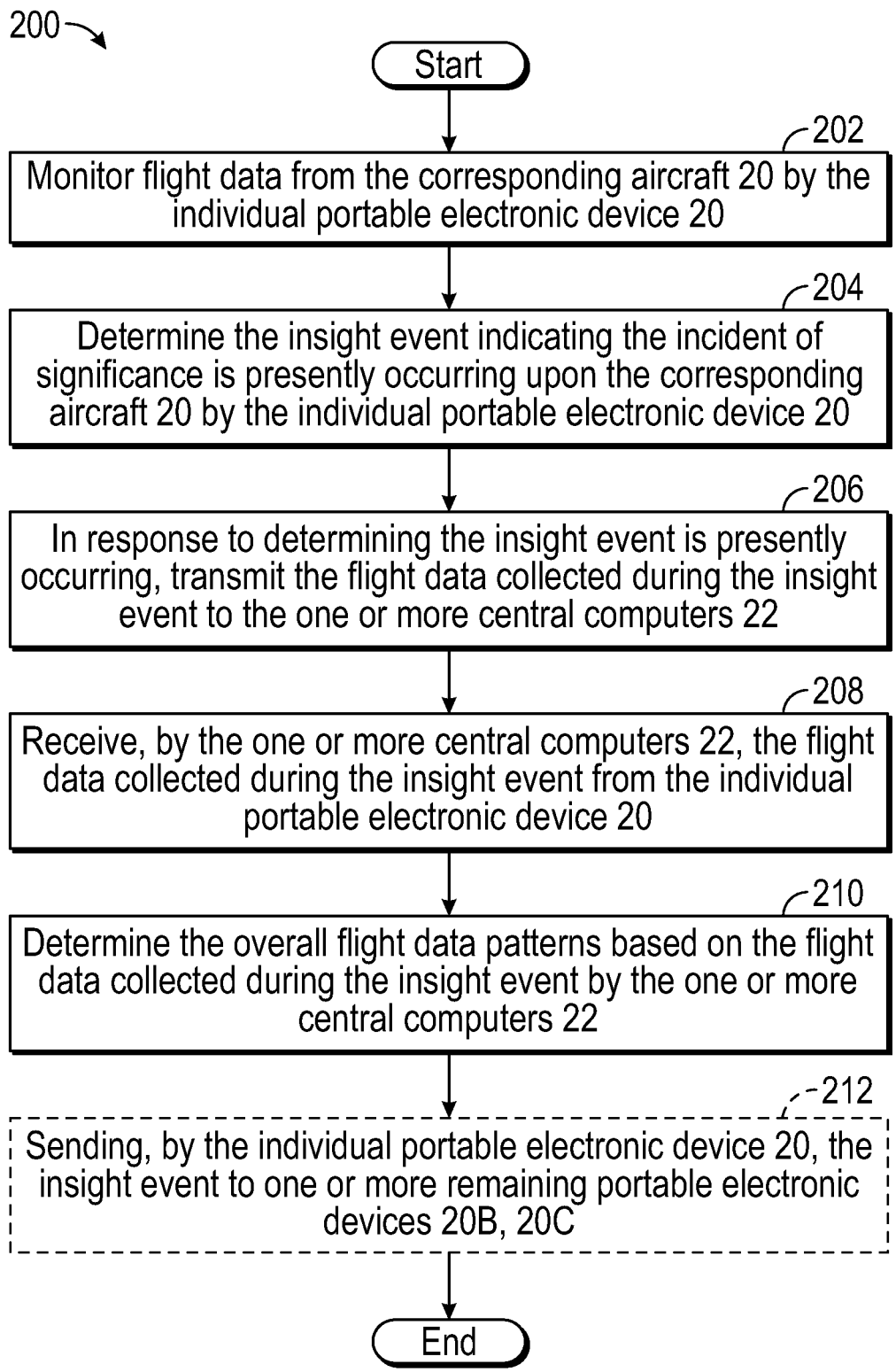
FIG. 4 is a process flow diagram illustrating a method for aggregating flight data based on the one or more portable electronic devices, according to an illustrative embodiment.

FIG. 4 is a process flow diagram illustrating a method 200 for aggregating flight data based on the one or more portable electronic devices 20. Referring now to FIGS. 1, 2, and 4, the method 200 may begin at block 202. In block 202, an individual portable electronic device 20 monitors flight data from the corresponding aircraft 10. As mentioned above, the plurality of sensors 42 (seen in FIG. 2) monitor the flight data from the corresponding aircraft 10. The method 200 may then proceed to block 204.

Figure 5:
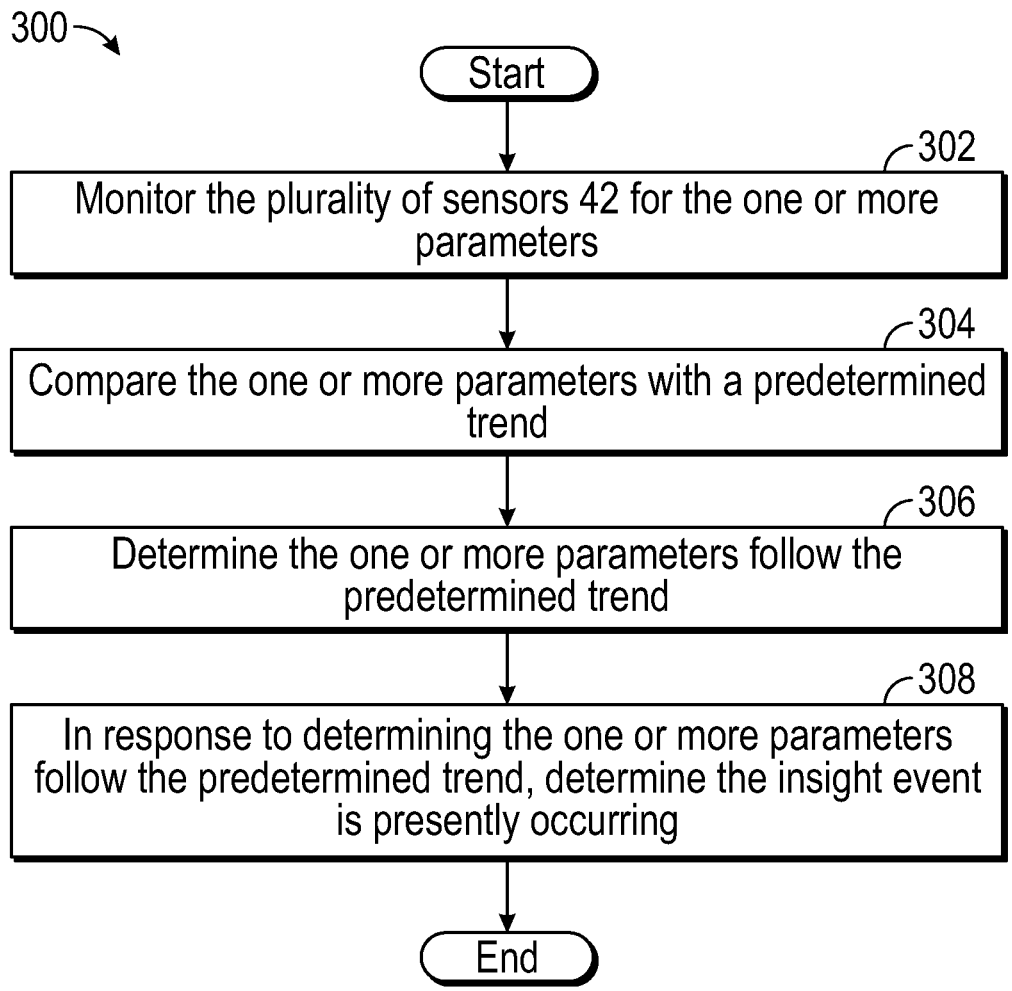
FIG. 5 is a process flow diagram illustrating a method for determining the insight event, according to an illustrative embodiment.

In block 204, the individual portable electronic device 20 determines the insight event indicating the incident of significance is presently occurring upon the corresponding aircraft 10. A method 300 for determining the insight event is shown in FIG. 5 and is described below. The method 200 may then proceed to block 206.

In block 206, in response to determining the insight event is presently occurring, the individual portable electronic device 20 transmits the flight data collected during the insight event to the one or more central computers 22. The method 200 may then proceed to block 208.

In block 208, the one or more central computers 22 receives the flight data collected during the insight event from the individual portable electronic device 20. The method 200 may then proceed to block 210.

In block 210, the one or more central computers 22 determine overall flight data patterns based on the flight data collected during the insight event received from the individual portable electronic device 20 and historical data stored in one or more databases 32. The method 200 may then proceed to block 212.

Block 212 is optional and is therefore illustrated in phantom line. In block 212, the individual portable electronic device 20 is part of a group of the portable electronic devices 20 that are in electronic communication with one another by the local area network 30, which is shown in FIG. 1. In block 212, the individual portable electronic device 20A sends the insight event to one or more remaining portable electronic devices 20B, 20C that are connected to the local area network 30. The method 200 5ay then terminate.

Referring now to FIG. 5, the method 300 for determining the insight event is now described. Referring to FIGS. 1, 2, 3A-3G, and 5, the method 300 begins at block 302. In block 302, the one or more processors 44 (FIG. 2) of the individual portable electronic device 20 monitors the plurality of sensors 42 for the one or more parameters. The method 300 may then proceed to block 304.

In block 304, the individual portable electronic device 20 compares the one or more parameters with the predetermined trend 60 (seen in FIG. 3C) representing a change in value of the one or more parameters. As mentioned above, the predetermined trend signifies the insight event is presently occurring. The method 300 may then proceed to block 306.

In block 306, the individual portable electronic device 20 determines the one or more parameters follow the predetermined trend 60. The method 300 may then proceed to block 308.

In block 308, in response to determining the one or more parameters follow the predetermined trend 60, the individual portable electronic device 20 determines the insight event is presently occurring upon the corresponding aircraft 10. The method may then terminate.

Referring generally to the figures, the disclosed flight data aggregation system includes various technical effects and benefits. Specifically, the flight data aggregation system employs sensors that are part of a portable electronic device. The portable electronic device operates independently of the aircraft to collect data instead of relying upon pilot reports or other existing technologies to collect data. Thus, the flight data aggregation system leverages the computing power of the portable electronic devices to analyze the flight data. Furthermore, the portable electronic devices analyze the data in real-time, which may not be possible with existing systems. Accordingly, the disclosed flight data system provides a relatively fast, inexpensive, and accurate approach for globally analyzing flight data across multiple aircraft.

Figure 6:
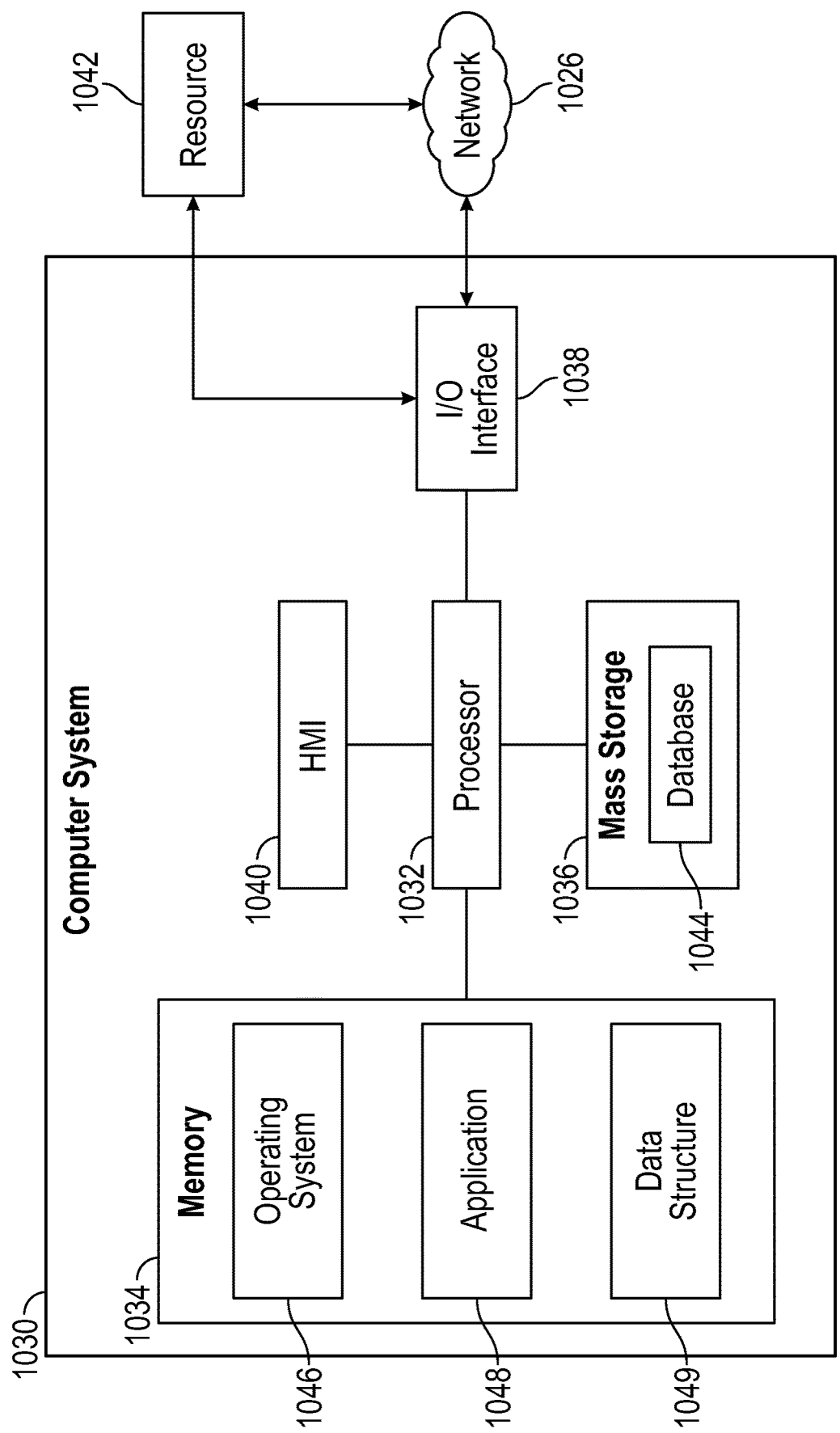
FIG. 6 illustrates an illustrative computer system for the disclosed system, according to an illustrative embodiment.

Referring to FIG. 6, the one or more central computers 22 are implemented on one or more computer devices or systems, such as illustrative computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely illustrative in nature and variations that do not depart from the gist of the present disclosure are intended to be within the scope of the present disclosure. Such variations are not to be regarded as a departure from the spirit and scope of the present disclosure.

What is claimed is:

1. A flight data aggregation system for a plurality of aircraft, the flight data aggregation system comprising:
   one or more portable electronic devices that each monitor flight data from a corresponding aircraft, wherein the one or more portable electronic devices analyze the flight data in real-time to determine that an insight event indicating an incident of significance is presently occurring upon the corresponding aircraft, wherein the one or more portable electronic devices each include a plurality of sensors that monitor the flight data from the corresponding aircraft, and wherein the insight event includes one of the following: landing distance, out, off, on and in (OOOI) times, takeoff distance, phase of flight, a congested taxiway, flight level change, holding, height loss during the climb phase of flight, lavatory use, de-icing or anti-icing status, runway surface conditions, GPS spoofing or jamming events, and crew punctuality and location tracking; and
   one or more central computers in electronic communication with at least one of the one or more portable electronic devices, wherein each central computer includes one or more processors and a memory coupled to the one or more processors, the memory storing data into one or more databases and program code that, when executed by the one or more processors, causes the one or more central computers to:
      receive the flight data collected during an insight event from an individual portable electronic device, wherein the individual portable electronic device is caused to:
         monitor the plurality of sensors for one or more parameters;
         compare one or more parameters with a predetermined trend representing a change in value of the one or more parameters, wherein the predetermined trend signifies the insight event is presently occurring;
         determine the one or more parameters follow the predetermined trend;
         in response to determining the one or more parameters follow the predetermined trend, determine the insight event is presently occurring upon the corresponding aircraft;
         in response to determining the insight event is presently occurring, transmit the flight data associated with the insight event to the one or more central computers; and
      determine one or more overall flight data patterns based on the flight data collected during the insight event received from the individual portable electronic device and historical data stored in the one or more databases, wherein the historical data represents previously collected flight data associated with insight events that occurred upon the plurality of aircraft.

2. The flight data aggregation system of claim 1, wherein the one or more portable electronic devices each include a plurality of sensors that monitor the flight data from the corresponding aircraft.

3. The flight data aggregation system of claim 2, wherein the plurality of sensors includes at least one of the following: a magnetometer, a gyroscope, a barometer, a microphone, and a global positioning system (GPS).

4. The flight data aggregation system of claim 2, wherein the plurality of sensors includes at least one of the following: a biometric sensor, an air quality sensor, a humidity sensor, an ambient temperature sensor, an infrared sensor, and a light detection and ranging (LiDAR) sensor.

5. The flight data aggregation system of claim 1, wherein the individual portable electronic device determines the one or more parameters follows the predetermined trend based on a change in value of the one or more parameters, a duration of time as the one or more parameters change in value, and contextual information regarding operation of the corresponding aircraft.

6. The flight data aggregation system of claim 1, wherein the flight data associated with the insight event includes one or more of the following: a time when the insight event occurred, a location where the insight event occurred, a phase of flight when the insight event occurred, a specific type of insight event, and one or more raw data samples.

7. The flight data aggregation system of claim 1, wherein a group of the one or more portable electronic devices including the individual portable electronic device are in electronic communication with one another by a local area network.

8. The flight data aggregation system of claim 7, wherein the individual portable electronic device sends the insight event to one or more remaining portable electronic devices connected to the local area network.

9. The flight data aggregation system of claim 1, wherein the individual portable electronic device is utilized by one of the following: a passenger onboard the corresponding aircraft, an individual located outside of the corresponding aircraft, or by a cabin crew of the corresponding aircraft.

10. The flight data aggregation system of claim 1, the flight data associated with the insight event is collected based on a particular airline fleet, a common manufacturer, or by a specific insight event.

11. A flight data aggregation system for a plurality of aircraft, the flight data aggregation system comprising:
    one or more portable electronic devices that each monitor flight data from one of the plurality of aircraft, wherein the one or more portable electronic devices include a plurality of sensors that monitor the flight data associated with one of the plurality of aircraft, wherein an individual portable electronic device is configured to:
       receive the flight data collected during an insight event, wherein the insight event includes one of the following: landing distance, out, OOOI times, takeoff distance, phase of flight, a congested taxiway, flight level change, holding, height loss during the climb phase of flight, lavatory use, de-icing or anti-icing status, runway surface conditions, GPS spoofing or jamming events, and crew punctuality and location tracking;
       monitor the plurality of sensors for one or more parameters;
       compare one or more parameters with a predetermined trend representing a change in value of the one or more parameters, wherein the predetermined trend signifies the insight event is presently occurring;
       determine the one or more parameters follow the predetermined trend;

in response to determining the one or more parameters follow the predetermined trend, determine the insight event is presently occurring upon the corresponding aircraft; and in response to determining that the insight event is presently occurring, transmit the flight data associated with the insight event;

one or more central computers in electronic communication with the individual portable electronic device, wherein each central computer includes one or more processors and a memory coupled to the one or more processors, the memory storing data into one or more databases and program code that, when executed by the one or more processors, causes each of the one or more central computers to:

receive the flight data associated with the insight event from the individual portable electronic device; and determine one or more overall flight data patterns based on the flight data associated with the insight event received from the portable electronic device and historical data stored in the one or more databases, wherein the historical data represents previously collected flight data associated with insight events that occurred upon the plurality of aircraft.

12. The flight data aggregation system of claim 11, wherein the individual portable electronic device determines the one or more parameters follows the predetermined trend based on a change in value of the one or more parameters, a duration of time as the one or more parameters change in value, and contextual information regarding operation of the corresponding aircraft.

13. The flight data aggregation system of claim 11, wherein the one or more portable electronic devices each include a plurality of sensors that monitor the flight data from the corresponding aircraft.

14. The flight data aggregation system of claim 13, wherein the plurality of sensors includes at least one of the following: a magnetometer, a gyroscope, a barometer, a microphone, and a global positioning system (GPS).

15. The flight data aggregation system of claim 13, wherein the plurality of sensors includes at least one of the following: a biometric sensor, an air quality sensor, a humidity sensor, an ambient temperature sensor, an infrared sensor, and a light detection and ranging (LiDAR) sensor.

16. The flight data aggregation system of claim 11, wherein the flight data associated with the insight event includes one or more of the following: a time when the insight event occurred, a location where the insight event occurred, a phase of flight when the insight event occurred, a specific type of insight event, and one or more raw data samples.

17. A method for aggregating flight data for a plurality of aircraft by one or more portable electronic devices, the method comprising:

monitoring, by an individual portable electronic device, flight data from a corresponding aircraft, wherein the one or more portable electronic devices each include a plurality of sensors that monitor the flight data from the corresponding aircraft;

determining, by the individual portable electronic device, that an insight event indicating an incident of significance is presently occurring upon the corresponding aircraft, wherein the insight event indicates an incident of significance is presently occurring upon the corresponding aircraft, and wherein the insight event includes one of the following: landing distance, out, OOOI times, takeoff distance, phase of flight, a congested taxiway, flight level change, holding, height loss during the climb phase of flight, lavatory use, de-icing or anti-icing status, runway surface conditions, GPS spoofing or jamming events, and crew punctuality and location tracking;

transmitting, by the individual portable electronic device, the flight data collected during the insight event to one or more central computers;

receiving, by the one or more central computers, the flight data collected during the insight event from the individual portable electronic device; and determining, by the one or more central computers, one or more overall flight data patterns based on the flight data collected during the insight event and historical data stored in one or more databases, wherein the historical data represents previously collected flight data associated with insight events that occurred upon the plurality of aircraft, and wherein the individual portable electronic device determines the insight event by:

monitoring the plurality of sensors of the individual portable electronic device for one or more parameters;

comparing, by the individual portable electronic device, one or more parameters with a predetermined trend representing a change in value of the one or more parameters, wherein the predetermined trend signifies the insight event is presently occurring;

determining the one or more parameters follow the predetermined trend; and in response to determining the one or more parameters follow the predetermined trend, determining the insight event is presently occurring upon the corresponding aircraft.

18. The method of claim 17, further comprising:

determining the one or more parameters follow the predetermined trend based on a change in value of the one or more parameters, a duration of time as the one or more parameters change in value, and contextual information regarding operation of the corresponding aircraft.

19. The method of claim 17, wherein a group of portable electronic devices are in electronic communication with one another by a local area network, wherein the individual portable electronic device is part of the group of portable electronic devices.

20. The method of claim 19, further comprising:

sending, by the individual portable electronic device, the insight event to one or more remaining portable electronic devices connected to the local area network.

* * * * *